United States Patent
Gerstel (10) Patent No.: US 11,316,728 B2
(45) Date of Patent: Apr. 26, 2022

(54) METHOD AND SYSTEM FOR ASSESSING NETWORK RESOURCE FAILURES USING PASSIVE SHARED RISK RESOURCE GROUPS

(71) Applicant: SEDONASYS SYSTEMS LTD, Ramat Gan (IL)

(72) Inventor: Ornan Alexander Gerstel, Tel Aviv (IL)

(73) Assignee: SEDONASYS SYSTEMS LTD, Raanana (IL)

( * ) Notice: Subject to any disclaimer, the term of this patent is extended or adjusted under 35 U.S.C. 154(b) by 0 days.

(21) Appl. No.: 17/105,544

(22) Filed: Nov. 26, 2020

(65) Prior Publication Data
US 2021/0105173 A1 Apr. 8, 2021

Related U.S. Application Data

(63) Continuation of application No. 17/059,225, filed as application No. PCT/IL2019/050408 on Apr. 11, 2019.

(Continued)

(51) Int. Cl.
*H04L 12/24* (2006.01)
*G06F 11/07* (2006.01)
(Continued)

(52) U.S. Cl.
CPC ........ *H04L 41/0654* (2013.01); *G06F 11/079* (2013.01); *H04L 41/0677* (2013.01);
(Continued)

(58) Field of Classification Search
CPC ............ H04L 41/0654; H04L 41/0677; H04L 43/0823; H04L 45/22; H04L 43/0811;
(Continued)

(56) References Cited

U.S. PATENT DOCUMENTS 7,570,580 B1 * 8/2009 Bajpay .................. H04L 41/064
370/216
7,587,634 B2 * 9/2009 Imai ..................... G06F 11/0709
714/26

(Continued)

OTHER PUBLICATIONS

SuKyoung Lee, Chui Kim and D. Griffith, "Hierarchical restoration scheme for multiple failures in GMPLS networks," Proceedings. International Conference on Parallel Processing Workshop, 2002, pp. 177-182, doi: 10.1109/ICPPW.2002.1039728. (Year: 2002).*

(Continued)

*Primary Examiner* — Patrice L Winder
(74) *Attorney, Agent, or Firm* — Lee & Hayes, P.C.

(57) ABSTRACT

A method for analyzing failures in network resources in a multilayered communication network using passive shared risk resource groups may include, in a processor, identifying network resources in a plurality of network resources having common risk attributes. The network resources may be grouped into one or more passive shared risk resource groups (PSRG) based on the common risk attributes. A likelihood of a PSRG failure may be assessed for each of the one or more PSRGs.

20 Claims, 8 Drawing Sheets

Related U.S. Application Data (60) Provisional application No. 62/677,015, filed on May 27, 2018.

(51) Int. Cl.

| | | |
|---|---|---|
| *H04L 12/26* | (2006.01) | |
| *H04L 12/707* | (2013.01) | |
| *H04L 41/0654* | (2022.01) | |
| *H04L 41/0677* | (2022.01) | |
| *H04L 43/0823* | (2022.01) | |
| *H04L 45/00* | (2022.01) | |
| *H04L 43/0811* | (2022.01) | |

(52) U.S. Cl.
CPC ...... *H04L 43/0811* (2013.01); *H04L 43/0823* (2013.01); *H04L 45/22* (2013.01)

(58) Field of Classification Search
CPC ... H04L 41/5009; H04L 41/064; G06F 11/079
See application file for complete search history.

(56) References Cited

U.S. PATENT DOCUMENTS

| | | | | |
|---|---|---|---|---|
| 7,808,888 B2* | 10/2010 | Kibel | ............... | H04L 12/66 370/216 |
| 7,991,872 B2* | 8/2011 | Wong | ............... | H04L 41/024 709/223 |
| 8,484,336 B2* | 7/2013 | Meir | ............... | H04L 41/12 709/224 |
| 8,595,568 B2* | 11/2013 | Yoon | ............... | H04L 41/00 714/57 |
| 8,812,279 B2* | 8/2014 | Perrett | ............... | H04L 45/64 703/2 |
| 9,258,174 B1* | 2/2016 | Gerstel | ............... | H04L 29/06537 |
| 9,426,062 B2* | 8/2016 | Fiorone | ............... | H04L 45/50 |
| 10,616,043 B2* | 4/2020 | Wang | ............... | H04L 41/12 |
| 2013/0265880 A1* | 10/2013 | Lee | ............... | H04L 43/08 370/235 |
| 2014/0314400 A1* | 10/2014 | Lee | ............... | H04L 45/28 398/1 |
| 2014/0355453 A1* | 12/2014 | Zhang | ............... | B01D 19/0404 370/242 |

OTHER PUBLICATIONS

T. Miyamura, T. Kurimoto, A. Misawa and S. Urushidani, "A disjoint path selection scheme based on enhanced shared risk link group management for multi-reliability service," GLOBECOM '05. IEEE Global Telecommunications Conference, 2005., 2005, pp. 6 pp. 1884, doi: 10.1109/GLOCOM.2005.1577993. (Year: 2005).*

* cited by examiner

METHOD AND SYSTEM FOR ASSESSING NETWORK RESOURCE FAILURES USING PASSIVE SHARED RISK RESOURCE GROUPS

FIELD OF THE INVENTION

The present invention relates to communication networks, and particularly to methods and systems for assessing failures in network resources using passive shared risk resource groups.

BACKGROUND OF THE INVENTION

A communication network may include one or multiple layers of network resources, for example, an internet protocol (IP) layer, an optical transport networking layer (OTN) and an optical layer, such as a wavelength division multiplex (WDM) optical layer. The IP layer and the optical layer may also be referred to herein as the client and server layer, respectively. Network resources may include a link, a node, a line card, and an optical fiber, for example. Network services and/or network connections may be defined in the multiple network layers.

Figure 1:
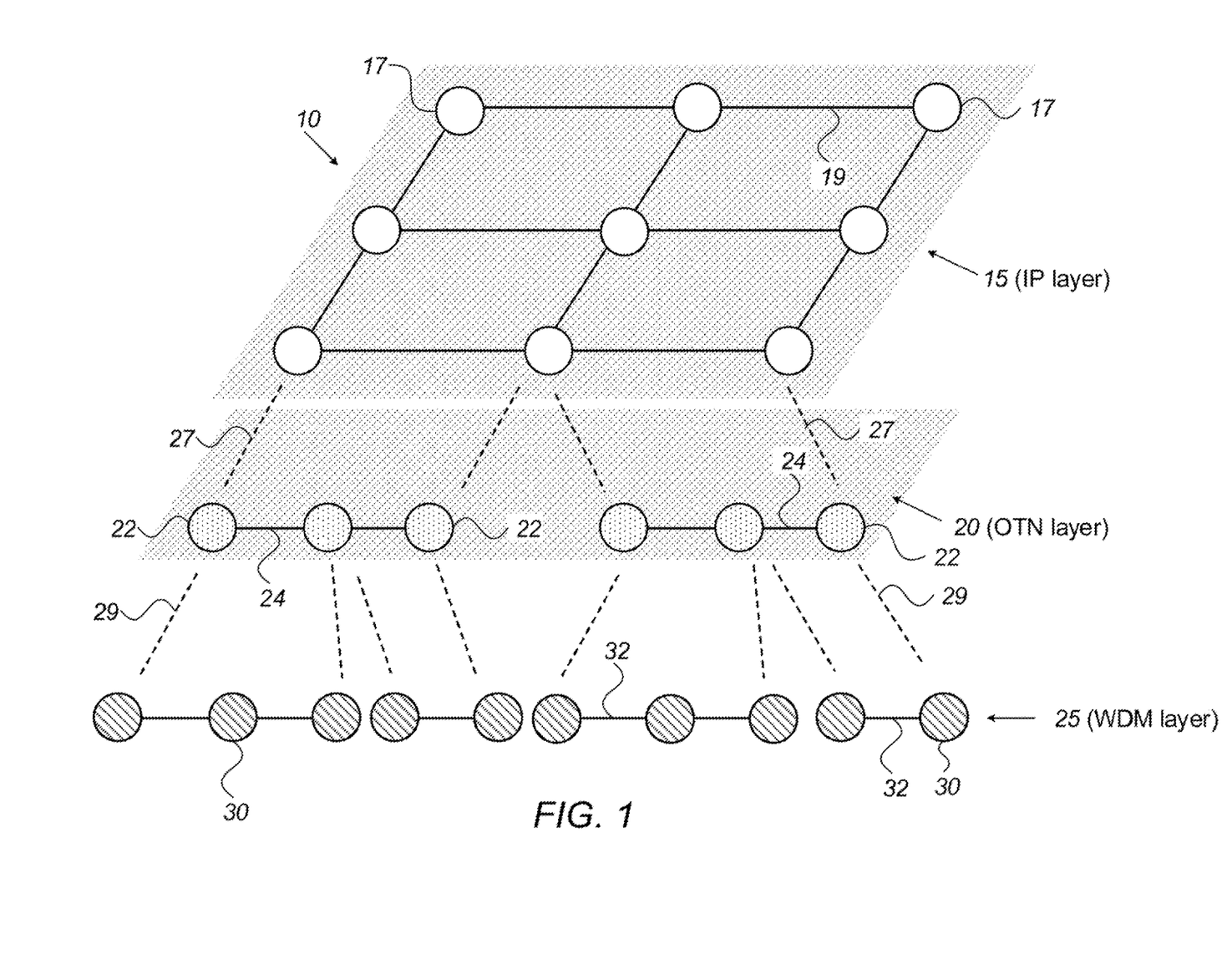
FIG. 1 schematically illustrates a multilayered communication network with a vertical topology.

FIG. 1 schematically illustrates a multilayered communication network 10 with a vertical topology. Multilayered communication network 10 may include an IP layer 15, an optical transport networking (OTN) layers 20, and a wavelength division multiplexing (WDM) 25. IP layer 15 may include IP routers 17 connected by links 19. The optical signals in IP layer 15 may be coupled to OTN layer 20 via a vertical communication path 27, and the optical signals in OTN layer 20 may be coupled to WDM layer 25 via a vertical communication path 29. Furthermore, vertical connection paths may skip a layer and connect, for example IP layer 15 directly to WDM layer 25. OTN layer 20 may include OTN switches 22 connected by links 24. WDM layer 25 may include WDM switches 30 connected by links 32. IP routers 17 and OTN switches 22 may typically operate in the electrical domain to route data packets and connections respectively through the network. WDM switches 30 may use photonic switching to route light paths along the multiple links 32 in WDM layer 25.

The layers, or data planes, in FIG. 1 may be arranged in a vertical topology whereby the lower layer service provisioning provides capabilities at the higher layers. Stated differently, the links in the upper network layers may be supported by connections in the lower layers. For example, data packets routed through an IP router in San Francisco may appear be connected to an IP router in New York City, but the data packets from San Francisco to New York City may be routed through the OTN or WDM layers.

In the event of a failure in multiple network resources particularly in a lower level, an operator may receive a flood of network resource failure alarms in a central control station without knowledge of which failed resource is most critical for restoring normal network operation. Thus, it may be desirable to have a method and a system to help the operator assessing which of the failed network resources may be most critical.

SUMMARY OF THE INVENTION

There is thus provided, in accordance with some embodiments of the present invention, a method for analyzing failures in network resources in a multilayered communication network using passive shared risk resource groups, which may include, in a processor, identifying network resources in a plurality of network resources having common risk attributes. The network resources may be grouped into one or more passive shared risk resource groups (PSRG) based on the common risk attributes. A likelihood of a PSRG failure may be assessed for each of the one or more PSRGs.

Furthermore, in accordance with some embodiments of the present invention, identifying the network resources with the common risk attributes may include limiting a search for the common risk attributes in network resources geographically close to one another.

Furthermore, in accordance with some embodiments of the present invention, the method may include outputting the likelihood of the PSRG failure for each of the one or more PSRG.

Furthermore, in accordance with some embodiments of the present invention, the method may include defining the one or more PSRG based on a predefined mapping of said plurality of network resources in the communication network.

Furthermore, in accordance with some embodiments of the present invention, identifying the network resources in said plurality of network resources having the common risk attributes may include identifying one or more failed network resources from said plurality of network resources having the common risk attributes.

Furthermore, in accordance with some embodiments of the present invention, assessing the likelihood of the PSRG failure may include assigning a higher likelihood when failures of the one or more failed network resources in each of the one or more PSRG meet a predefined criterion.

Furthermore, in accordance with some embodiments of the present invention, the predefined criterion may be selected from the group consisting of failures of the one or more failed network resources that are geographically close to one another, failures of at least two failed network resources that occur substantially at the same time, and failures of at least two failed network resources that failed together in the past.

Furthermore, in accordance with some embodiments of the present invention, the method may include automatically restoring the one or more failed network resources associated with each of the one or more PSRG in accordance with the likelihood of the PSRG failure.

There is further provided, in accordance with some embodiments of the present invention, a method for assessing failures in network resources in a multilayered communication network, which may include, in a processor, receiving indications of failures in one or more network resources from a plurality of network resources in a communication network including a plurality of network layers. The failures in the one or more failed network resources may be assessed in each of progressively lower network layers from a highest network layer to a lowest network layer in said plurality of network layers, or in each of progressively higher network layers from the lowest network layer to the highest network layer in said plurality of network layers. A set of failed network resources from the one or more failed network resources may be identified in the progressively lower network layers causing failures in network layers above the progressively lower network layers, or from the one or more failed network resources in the progressively higher network layers causing failures in network layers below the progressively higher network layers.

Furthermore, in accordance with some embodiments of the present invention, identifying the set may include identifying root causes of the failures in the communication network.

Furthermore, in accordance with some embodiments of the present invention, receiving the indications of failures may include receiving the failure indications in response to polling at least one of said plurality of network resources.

Furthermore, in accordance with some embodiments of the present invention, identifying the set of failed network resources may include identifying a minimal set of failed network resources causing all the failures in the communication network.

Furthermore, in accordance with some embodiments of the present invention, the highest network layer and the lowest network layer may include an internet protocol (IP) layer and a wavelength division multiplexing (WDM) layer respectively.

Furthermore, in accordance with some embodiments of the present invention, the method may include arranging the failures according to each network layer in said plurality of network layers.

Furthermore, in accordance with some embodiments of the present invention, assessing the failures may include skipping network layers from which no failure indications are received.

Furthermore, in accordance with some embodiments of the present invention, if upon receiving no failure indications from said plurality of network layers in the communication network, the method may include deducing a suspected set of network resources from said plurality of network resources in said plurality of network layers that cause the failures in the communication network.

Furthermore, in accordance with some embodiments of the present invention, the method may include sending requests to the network resources in the suspected set to report their failure.

Furthermore, in accordance with some embodiments of the present invention, the method may include updating a database with the reported failures of the network resources in the suspected set.

Furthermore, in accordance with some embodiments of the present invention, the method may include automatically rerouting data traffic around the network resources in the suspected set.

Furthermore, in accordance with some embodiments of the present invention, if upon assessing that the failed network resources in the identified set do not account for all of the failures in the one or more failed network resources from the highest network layer to the lowest network layer, the method may include:
  identifying network resources in a plurality of network resources in a communication network including a plurality of network layers having common risk attributes;
  grouping the network resources with the common risk attributes into one or more passive shared risk resource groups (PSRG); and
  assessing a likelihood of a PSRG failure for each of the one or more PSRGs.

Furthermore, in accordance with some embodiments of the present invention, the method may include outputting the set of failed network resources from the one or more failed network or the likelihood of the PSRG failure for each of the one or more PSRGs.

There is further provided, in accordance with some embodiments of the present invention, an apparatus for analyzing failures in network resources in a multilayered communication network using passive shared risk resource groups, which may include a memory and a processor. The processor may be configured to identify network resources in a plurality of network resources having common risk attributes, to group the network resources into one or more passive shared risk resource groups (PSRG) based on the common risk attributes, and to assess a likelihood of a PSRG failure for each of the one or more PSRGs.

There is further provided, in accordance with some embodiments of the present invention, an apparatus for assessing failures in network resources in a multilayered communication network, which may include a memory and a processor. The processor may be configured to receive indications of failures in one or more network resources from a plurality of network resources in a communication network including a plurality of network layers, to assess the failures in the one or more failed network resources in each of progressively lower network layers from a highest network layer to a lowest network layer in said plurality of network layers, or in each of progressively higher network layers from the lowest network layer to the highest network layer in said plurality of network layers, and to identify a set of failed network resources from the one or more failed network resources in the progressively lower network layers causing failures in network layers above the progressively lower network layers, or from the one or more failed network resources in the progressively higher network layers causing failures in network layers below the progressively higher network layers.

BRIEF DESCRIPTION OF THE DRAWINGS

In order for the present invention, to be better understood and for its practical applications to be appreciated, the following Figures are provided and referenced hereafter. It should be noted that the Figures are given as examples only and in no way limit the scope of the invention. Like components are denoted by like reference numerals.

DETAILED DESCRIPTION OF THE INVENTION

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple", two, or more. The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

While an operator may be monitoring data traffic in multilayer communication network 10 at a central control station, for example, the operator may receive multiple network resource failure alarms indicating failures in one or more network resources. Fault isolation, or root cause analysis, may be used to assess the multiple failures. Fault isolation may be used to analyze failures in successively lower network layers in the multilayered communication network, so as to identify a single failed network resource in a lower network layer, which may be used to explain failures in upper network layers. However, in the case where there are multiple failures that may not be explained after having analyzed failed resources on the lowest layer, correlation between failures that have common failure risk attributes may be analyzed to determine if there is a passive shared risk resource group (PSRG).

Embodiments of the present invention describe herein a system and method for analyzing failures in network resources in a multilayered communication network using passive shared risk resource groups.

Figure 2:
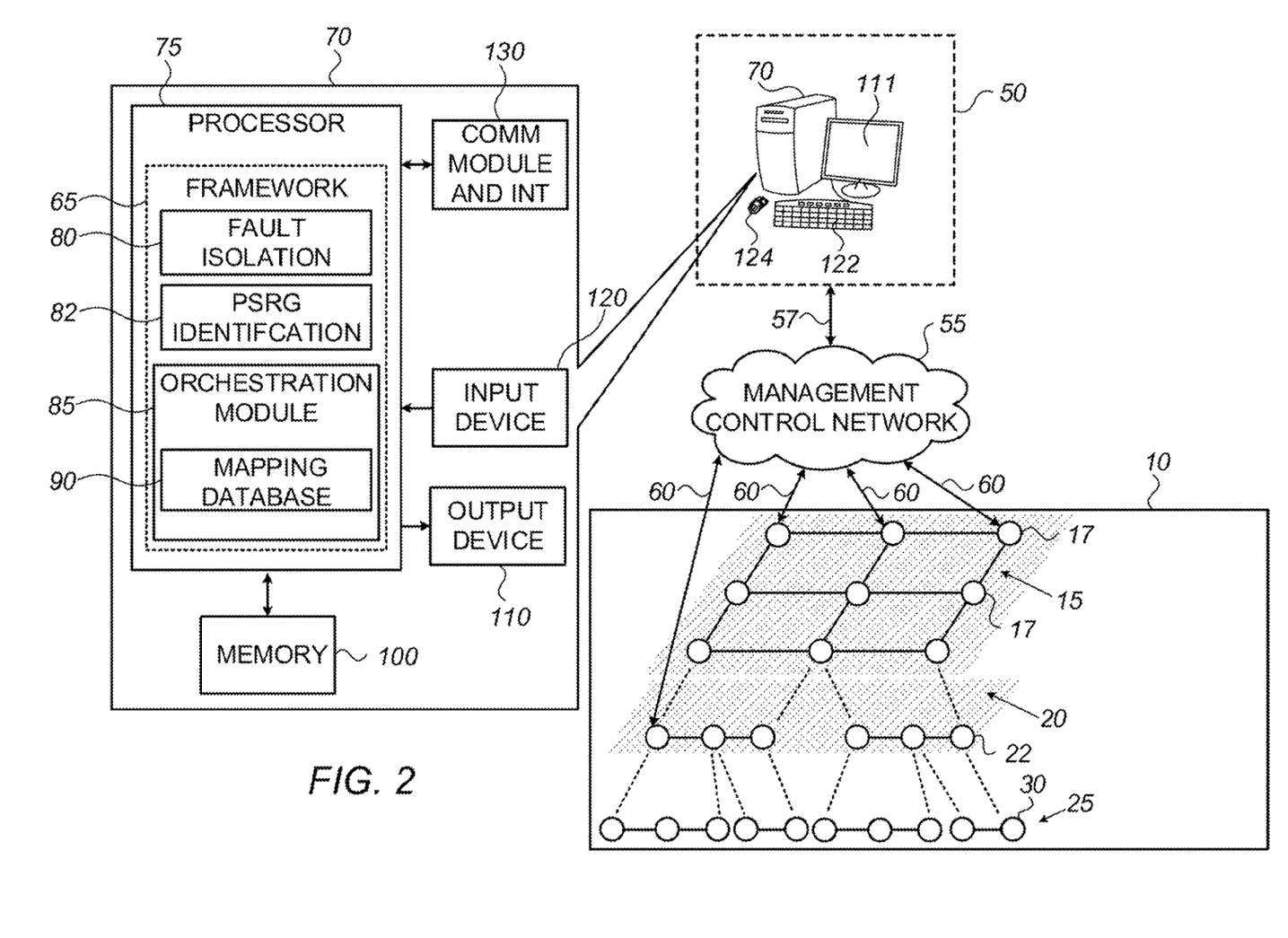
FIG. 2 schematically illustrates a system for monitoring and analyzing network resource failures in a communication network, in accordance with some embodiments of the present invention.

FIG. 2 schematically illustrates a system 50 for monitoring and analyzing network resource failures in communication network 10, in accordance with some embodiments of the present invention. System 50 may include a server 70, which further includes a processor 75 coupled to a memory 100, an input device 120, an output device 110, and a communication module and interface 130. Server 70 may be part of, or may be in communication 57 with multilayered communication network 10 through a management/control network 55 also communicating 60 with network resources such as IP routers 17, OTN switches 22, and WDM switches 30, for example, in the different network layers.

Although the embodiments shown in FIG. 2 illustrate a communication network with IP and optical links, for example, system 10 may also include microwave links and/or free space optical links (not shown in the figure).

Processor 75 may include one or more processing units, e.g. of one or more computers. Processor 75 may be configured to operate in accordance with programmed instructions stored in memory 100. Processor 75 may be capable of executing an application for analyzing failures in network resources in a multilayered communication network using passive shared risk resource groups.

Processor 75 may communicate with output device 110. For example, output device 110 may include a computer monitor or screen. Processor 12 may communicate with a screen 111 of output device 110 to display an analysis of failure indications in the network resources. In another example, output device 110 may include a printer, display panel, speaker, or another device capable of producing visible, audible, or tactile output.

In some embodiments of the present invention, output device 110 may include another system capable of analyzing failures in network resources in a multilayered communication network using passive shared risk resource groups. Alternatively or additionally, output device 110 may include any system capable of receiving and processing any suitable information regarding the failures in network resources in a multilayered communication network using passive shared risk resource groups.

Processor 75 may communicate with input device 120. For example, input device 120 may include one or more of a keyboard 122, keypad, or pointing device 124 (e.g., a mouse) for enabling a user to inputting data or instructions for operation of processor 75.

Processor 75 may communicate with memory 100. Memory 100 may include one or more volatile or nonvolatile memory devices. Memory 100 may be utilized to store, for example, programmed instructions for operation of processor 75, data or parameters for use by processor 75 during operation, or results of operation of processor 75. In operation, processor 75 may execute a method for analyzing failures in network resources in a multilayered communication network using passive shared risk resource groups.

Server 70 may also be referred to herein as a central controller, a central control station, or a top-level controller. A framework 65 may be operating on processor 75 of server 70. The term "framework" may refer to a user-written application-specific software stored in memory 100 and executed on processor 75. Framework 65 may include a fault isolation module 80, a passive shared risk resource group (PSRG) identification module 82, and an orchestration software module 85 that further includes a mapping database 90 that represents multilayered network 10, its nodes, links and traffic statistics.

In some embodiments of the present invention, mapping database 90 may include mappings of which ports of IP routers 17 map into which ports in OTN switches 22 and WDM switches 30, for example, and vice versa, or into any other network layers in multilayered communication network 10. Mapping database 90 may include the entire general connectivity topology (e.g., cross layer mapping) of multilayered communication network 10. Orchestration module 85 may be used for mapping service requests to available network resources in the multilayered environment and optimizing the usage of different types of network resources. The embodiment shown herein may be also applicable to systems not supporting auto-discovery of cross-layer mapping.

Server 70 may be located, for example, typically at one location to monitor data traffic in the network resources of multilayered communication network 10 by a network operator via communication module and interface 130. Server 70 may be implemented within one multilayered communication network 10 operated by the network operator. Server 70 may monitor the data traffic throughout the network resources in the communication network. Framework 65 may be used to control and to monitor all aspects of the data traffic for the network operator in this exemplary embodiment.

Figure 3A:
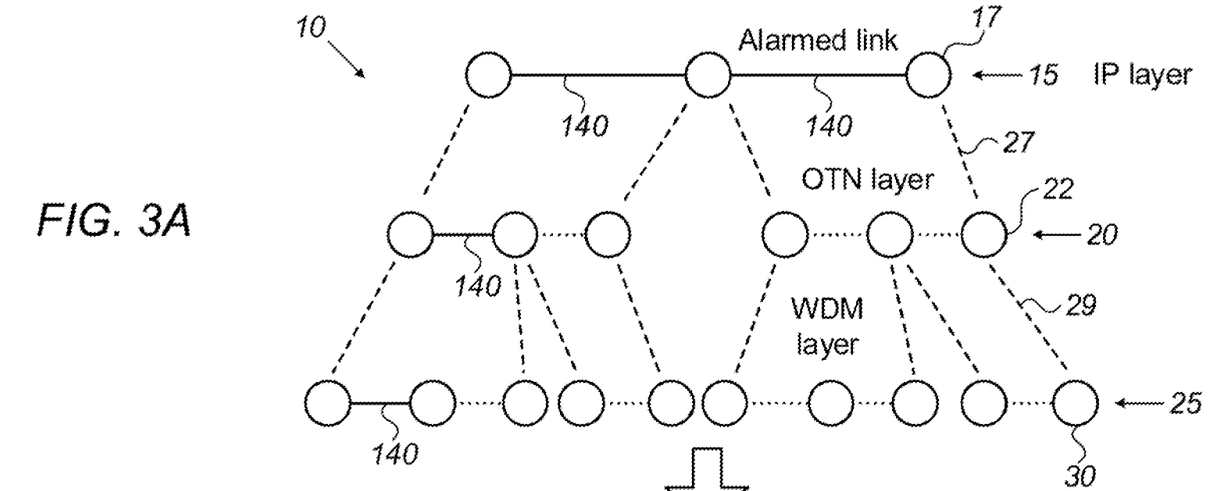
FIG. 3A schematically illustrates a communication network with multiple network resource failures, in accordance with some embodiments of the present invention.

FIG. 3A schematically illustrates communication network 10 with multiple network resource failures, in accordance with some embodiments of the present invention. When a failure in one or more network resources 140 occurs, an operator monitoring the operation of multilayered communication network 10 may receive a failure indication, such as a failure alarm, regarding the one or more failed network resources on display 111, for example. A failure of a network resource is not limited to a catastrophic failure of the network resource in the context of the disclosure herein, but may include a network resource exhibiting a performance degradation such as higher bit error rate, higher noise, and/or higher optical loss, for example.

Furthermore, when a failure in one or more network resources, such as links, occurs in a lower network layer, such as WDM layer 25, for example, the failed links affect communication layers above the communication layer with the one or more failed resources, such as in IP layer 15 and in OTN layer 20. As a result, an operator may receive a flood of network resource failure indications related to network resources throughout multilayered communication network 10 making it hard for the operator to identify which of failed network resources 140 may cause the largest impact on the data traffic and which of failed network resources 140 needs to be fixed first.

In some embodiments of the present invention, system 50 may identify a set or a minimum set of failed network resources from the one or more failed network resources, which cause a largest impact on the data traffic in the communication network, relative to the impact on the data traffic from the other failed network resources, so as to explain the failures of the one or more failed network resources outside of the set. State differently, system 50 may be configured to identify root causes of all the failures in communication network 10.

The failed network resources in the set may also be referred to herein as root cause failures. Fixing the root cause failures first may typically be the fastest way of minimizing the largest impact in the data traffic. For example, a specific failed network resource may cause a bottleneck in data traffic throughout multilayered communication network 10 even though other failed resources may be connected to the specific failed network resource, e.g., the root cause failure causing the data traffic bottleneck or network congestion. Manually or automatically rerouting the data traffic around the specific failed network resource may alleviate the network congestion.

Stated differently, identifying the root cause failures may be a fast way for the operator to pinpoint the failed network resources which had the biggest impact in the performance degradation in the communication network. As a result, the operator may use fault isolation techniques such as root cause analysis (RCA), for example, to identify specific network resource failures that caused the flood of alarms. Fault isolation algorithms may be used to find a minimum set of network resources R, the failure of which explains all the network resource failures. At the same time, set R does not imply failures of network resources which are not failed.

Figure 3B:
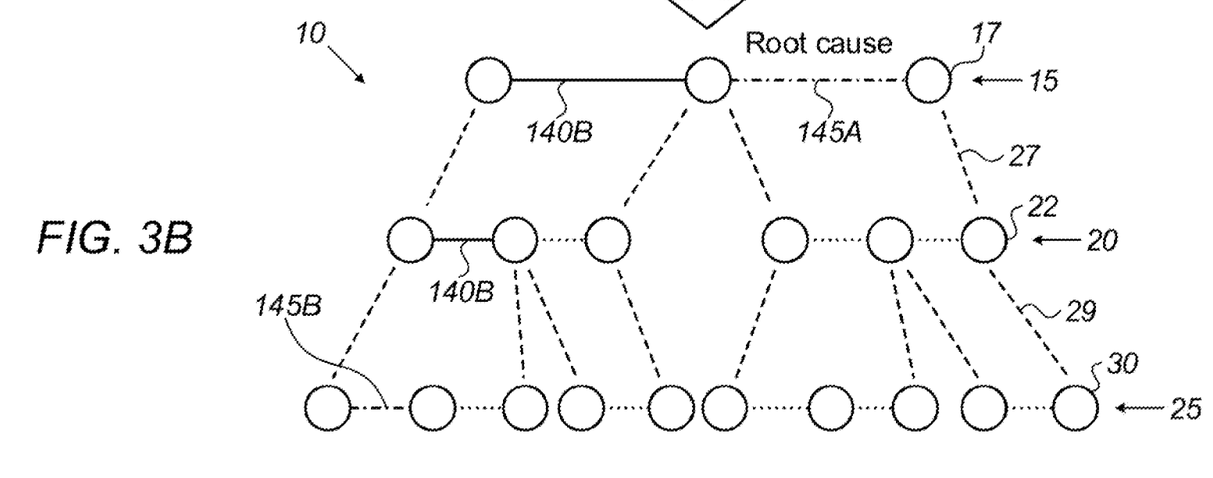
FIG. 3B schematically illustrates failed network resources identified as root cause failures, in accordance with some embodiments of the present invention.

FIG. 3B schematically illustrates failed network resources identified as root cause failures 145, in accordance with some embodiments of the present invention. System 50 may apply root cause analysis to multilayered communication network 10, in order to find a minimum set R of failed resources 145 (denoted 145A and 145B in FIG. 3B). Minimum set R may be used to explain all of the failures in the one or more network resources 140 resulting in a degradation of the performance metrics (e.g., latency, network congestion, etc.) of data traffic in multilayered communication network 10. Failure of network resource 145A is on top IP layer 15 and is a root cause failure since it does not explain the failure of any other failed network resources except for itself. However, the failure of network resource 145B in lower WDM layer 25 explains the failure of network resources (e.g., link 140B) on IP layer 15 and network resources (e.g., link 140B) on OTN layer 20.

The one or more network resources 140 may be distributed over a plurality of network layers in multilayered communication network 10, such as IP layer 15, OTN layer 20, and WDM layer 25 as shown throughout the various figures such as FIGS. 3A and 3B, for example. Most generally, index N may be used herein to refer to the $N^{th}$ top network layer and index K may be incremented from K=0, 1, 2, . . . , such that network layer N−K may represent any lower layer under top network layer N in multilayered communication network 10, where N and K are integers.

Furthermore, some network layer naming conventions may refer to IP layer 15 as layer 3, an Ethernet layer (not shown) as layer 2, OTN layer 20 as layer 1, and WDM layer 25 as layer 0, for example. Note that sometimes a link connecting a network resource in network layer N to a network resource N−2 without an intermediate network layer N−1 may be implemented, so there may not be consecutive network layer registration at all physical locations of communication network 10.

In some embodiments of the present invention, the fault isolation algorithms described herein may account for scenarios where system 50 may not have access to all of the network layers so as to identify and isolate the network resource failures. For example, system 50 may have access to IP layer events and not to alarms generated by faults in the optical layers. Furthermore, the algorithms used in fault isolation module 80 as described herein may account for situations where not all root causes for the network resource failures may be determined using root cause analysis methods. For example, network resources such as passive elements (e.g., fibers, data cables, etc) on multiple network layers that traverse a fiber duct, for example, where fiber duct may be damaged, thus damaging the passive elements. Root cause analysis, for example, may not be able to localize these failures based on the known connectivity of the failed network resources (e.g., from mapping database 90, for example).

In some embodiments of the present invention, system 50 may use an additional algorithm by grouping the failed network resources into passive shared risk resource (PSRG) groups based on common risk attributes. PSRG identification module 82 may search for failure risk relationships, or attributes, among the failed network resources such as a common physical location with fibers and/or cables running through the same fiber cabling duct.

In some embodiments of the present invention, PSRG identification module 82 may identify and/or group one or more failed network resources possessing common risk attributes into passive shared risk resource groups (PSRG). PSRG group identification module 82 may then compute and/or assign a likelihood of a PSRG failure for each of the one or more PSRGs in the communication network.

The fault isolation algorithms with incomplete alarms and the PSRG identification algorithms are now addressed hereinbelow. The term shared risk resource group may generally refer to a shared risk link group (SRLG), a shared risk node group (SRNG), and a shared risk equipment group (SREG) depending on the type of network resource. An SRG failure may result in multiple circuits failing in the communication network.

A passive SRG (PSRG) in the context of this disclosure may typically refer to any passive component associated with other network resources, such that a PSRG failure may cause the other associated resources to fail. For example, a fiber duct is a PSRG, which may include multiple fibers. When this duct is damaged, the fibers in the damaged duct may fail resulting in a degradation in data traffic and/or network performance (e.g., degradation in data rates and/or increased latencies, for example) due to the failed passive components.

Figure 4A:
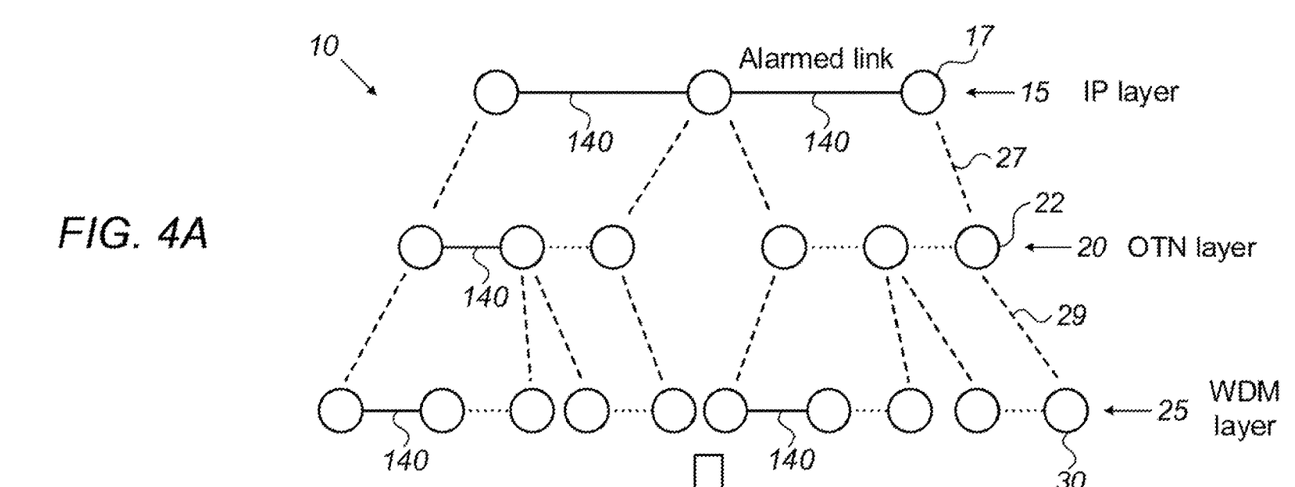
FIG. 4A schematically illustrates failed network resources with missing failure indications, in accordance with some embodiments of the present invention.

In some embodiments of the present invention, a fault isolation algorithm (e.g., in fault isolation module 80) may include analyzing all newly failed network resources. The already-failed network resources (e.g., older network resource failures) may not be taken into account by the algorithm. Fault isolation module 80 may arrange the newly-failed network resources by network layer. Fault isolation module 80 may examine network resources in the top or highest network layer N, (e.g., IP layer 15 in FIG. 4 where N-3).

Fault isolation module 80 may search for a set of network resources S in top network layer N that depend on a failed network resource X at layer N-K (e.g., a progressively lower layer). The terms progressively lower layers, or progressively lower network layers, may refer to herein as fault isolation module 80 analyzing the failures in the network layers moving from the top layer N to a lowest layer in communication network 10. A network layer in the progressively lower network layers is between the highest network layer (e.g., top network layer N) and the lowest network layer (e.g., typically the optical trunk layer). The term progressively lower network layers includes the lowest network layer and does not include the highest or top network layer.

FIG. 4A schematically illustrates failed network resources with missing failure indications, in accordance with some embodiments of the present invention.

Figure 4B:
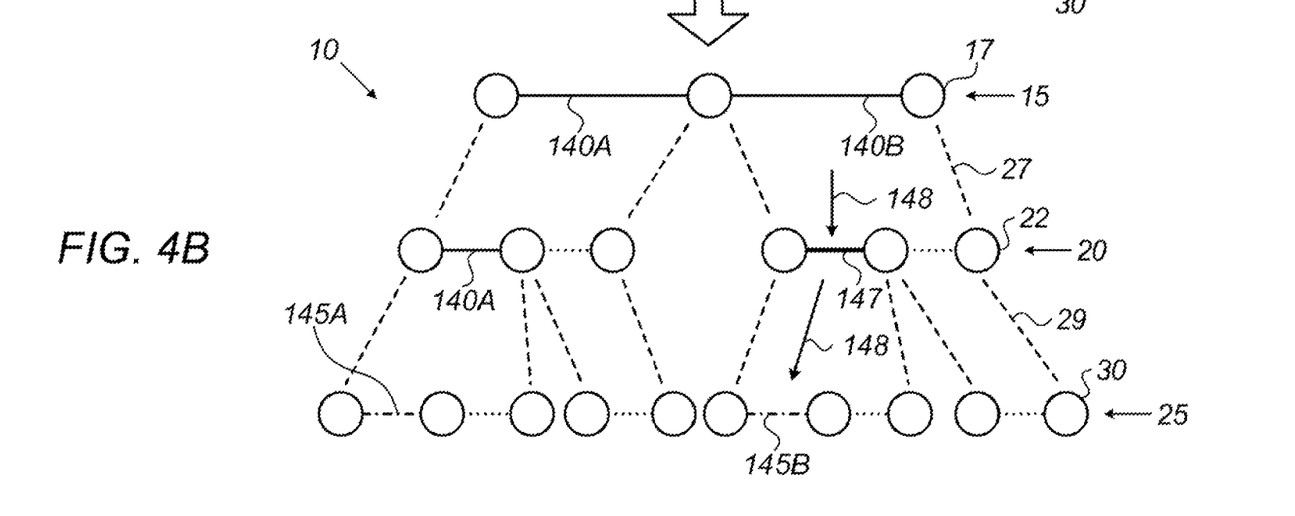
FIG. 4B schematically illustrates an exemplary embodiment where the analysis of failures in a lower network layer are used to account for failures without alarms in an upper network layer, in accordance with some embodiments of the present invention.

FIG. 4B schematically illustrates an exemplary embodiment where the analysis of failures in a lower network layer are used to account for failures without alarms in an upper network layer, in accordance with some embodiments of the present invention.

In the exemplary embodiment shown in FIGS. 4A and 4B, there are alarmed links on each of the three layers IP layer 17, OTN layer 20 and WDM layer 25 as shown in FIG. 4A. Fault isolation module 80 may assess that link 145A on WDM layer 25 is a root cause failure of links denote 140A on OTN layer 20 and on IP layer 15. Similarly, fault isolation module 80 may attempt to determine the root cause of the failure alarm indication associated with failed link 140B on IP layer 15. However, there are no alarmed links on OTN layer 20 as shown in FIG. 4A.

In some embodiments of the present invention, when analyzing the failures in progressively lower network layers, fault isolation module 80 may be configured to skip the analysis of failures in a specific network layer when no failure indication is received by the specific network layer as shown by arrows 148 in FIG. 4B. In this exemplary case, no failure indication is triggered in system 50 for failed network resource 147 (e.g., link 147) on OTN layer 20. However, in analyzing the failures in the WDM layer 25, fault isolation module 80 may identify and/or deduce that failed link 145B on WDM layer is the root cause failure of link 147 with no alarm on OTN layer 20 and alarmed link 140B on IP layer 15 via the mapping of the network resource connectivity, for example. Fault isolation module 80 may assess that link 145B in the lowest layer (e.g., WDM layer 25) is the root cause of the failure that accounts for the failures in link 147 and link 140B in the layers above WDM layer 25.

Fault isolation module 80 may start analyzing failures in network layer N-1. If there are no alarms in network layer N-1, fault isolation module 80 may skip over network layer N-1 and may proceed to analyze failures in networks layers N-2, N-3, and so forth until fault isolation module 80 finds a failed resource X in a network layer N-K that explains all of the failures in set of network resources S as schematically illustrated in FIG. 4B. If all of resources in set S failed, then failed resource X is the likely root cause. Root cause failure 145B (e.g., X) explains the failures of link 147 with no alarm and link 140B by skipping OTN layer 20 with no alarms.

In some embodiments of the present invention, fault isolation module 80 may then mark X as the root cause failure of resources in set S and identify that the failures of network resources in S are "explained" by the root cause failure of network resource X.

Fault isolation module 80 may identify a minimum set of resources R which explains a set of network resource failures F in communication system 15. Fault isolation module 80 may add failed network resources 140 to set R in analyzing the failures in the progressively lower layers (N-K), the analysis repeated until reaching the lowest network layer (e.g., WDM layer 25 in FIG. 4B).

FIGS. 4A and 4B illustrates failed network resources 140 which generated a failure alarm, whereas link 147, for example, failed but did not generate an alarm in this exemplary embodiment. Links 145A and 145B in set R are the root cause failures of network resources 140 and explain the failures of network resources 140.

Figures 5, 6:
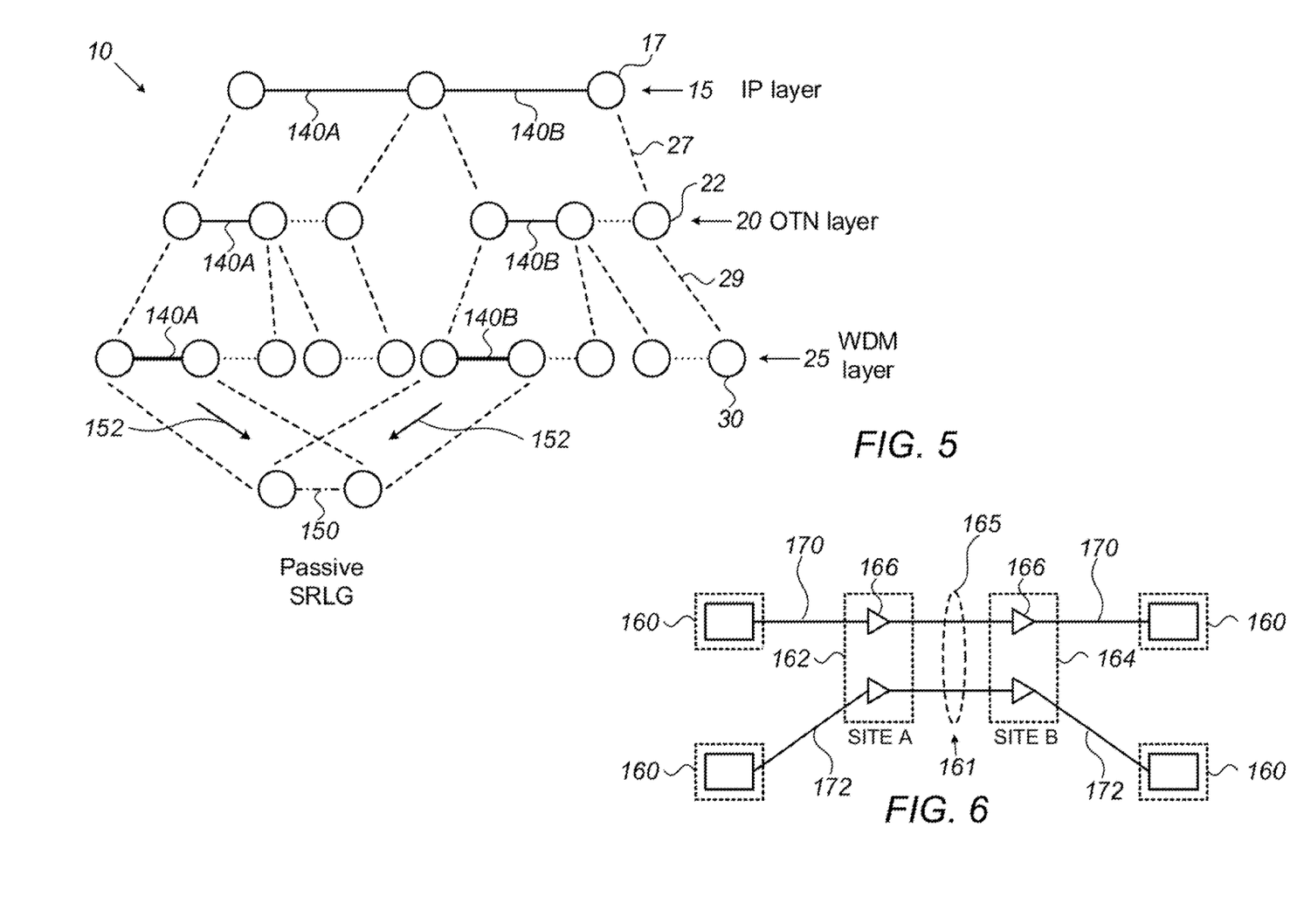
FIG. 5 schematically illustrates failed network links forming a passive shared risk link group (SRLG), in accordance with some embodiments of the present invention.
FIG. 6 schematically illustrates a passive shared risk group (PSRG) with network resources in the same geographical vicinity, in accordance with some embodiments of the present invention.

FIG. 5 schematically illustrates failed network links 140 forming a passive shared risk link group (SRLG) 150, in accordance with some embodiments of the present invention. When fault isolation module 80 in analyzing the failures in the progressively lower layers N–K reaches the lowest layer, such as WDM layer 25, and multiple root cause failures in failed network resources 140 occur at substantially the same time, there may be a common risk attribute between the multiple root cause failures. The common risk attribute may also be referred to herein as a common failure risk attribute, a common hidden risk, or a common failure risk relationship. In this case, PSRG identification module 82 may defined a passive shared risk link group, or passive SRLG. More generally, this may be referred to a passive shared risk group (PSRG). The passive SRLG may be added to the fault isolation model.

In some embodiments of the present invention, if upon reaching the lowest network layer in analyzing the failures, fault isolation module 80 determines that failed resources with multiple root cause failures have common risk attributes, PSRG identification module 82 may group the failed network resources with multiple root cause failures into one or more passive shared risk resource groups (PSRG), each PSRG with a respective common risk attribute (e.g., failure time, failure location). In some embodiments, PSRG identification module 82 may assess a likelihood L of a common failure risk for each of the one or more PSRG based on the respective common risk attribute. In some embodiments, L may be between 0 and 1.

In some embodiments of the present invention, if two failures of two respective network resources occur at the same time, PSRG identification module 82 may assign L some fixed value $L_0$. However, if the two failures do not occur at exactly the same time, L may be assigned a lower likelihood value of $L_1$ where $L_1 < L_0$. Stated differently, there is a higher common failure risk in the two network resources failing substantially at the same time, relative to the case of two failures not occurring at the same time. For example, L may be defined relative to a predefined time interval such as 50% if the failures happen less than one minute apart, and 30% if the failures occur two minutes apart. These are numerical examples just for conceptual clarity, and not by way of limitations of the embodiments of the present invention described herein.

In some embodiments of the present invention, if the failures are in fibers that are geographically close to one another, then L may be set to a higher value. If the fibers traverse a shared route such as in a portion of a fiber cable, the longer the shared route, the higher the likelihood L of common failure risk.

In some embodiments of the present invention, if two failures of two respective network resources occur again, where PSRG identification module 82 may assess a failure history of the network resources in communication network 15, which may be stored for example in memory 100, the likelihood of a common failure risk is much higher. L may be increased, for example, by a factor of 2.

In the exemplary embodiment shown in FIG. 5, failure alarms on links 140A and 140B on multiple layers (e.g., IP layer 15, OTN layer 20, and WDM layer 25) may alert an operator of system 50, for example, on display 111. To the operator, these network resource may appear to have no common risk attributes. However, as shown by arrows 152, PSRG identification module 82 may determine that the root cause failure of links 140A and 140B on such as two fibers on WDM layer 25 may be a result of the two fibers traversing the same underground fiber cable that may be damaged. PSRG identification module 82 may group and/or define the two fibers (e.g., links 140A and 140B on WDM layer 25) in the common underground fiber cable into passive SRLG 150.

FIG. 6 schematically illustrates a PSRG with network resources in the same geographical vicinity, in accordance with some embodiments of the present invention. A span between two network elements, which share a common site or the same geographic proximity may likely be an SRLG. As shown in FIG. 6, optical switches 160 may route optical signals in two optical fibers 170 and 172 respectively via two optical amplifiers 166 in a SiteA 162. From the outputs of optical amplifiers 160 in SiteA 162, the optical signals are routed in a fiber duct 161 spanning from SiteA 162 to a SiteB 164. SiteA 162 and SiteB 164 may be separated by large distances such as 100 km (e.g., long haul links), for example.

The optical signals in two optical fibers 170 and 172 upon entering SiteB 164 may be amplified by optical amplifiers 166. The amplifier optical signals in two optical fibers 170 and 172 leaving SiteB 166 may then be routed to their next destinations in the communication network by optical switches 160.

In the exemplary embodiment shown in FIG. 6, fiber duct 161 may be a passive SRLG 165 with two optical fibers 170 and 172 as the two network resources grouped into passive SRLG 165 with the common risk attribute as being collocated in fiber duct 161 over the distance spanning between SiteA 162 to SiteB 164. In this case, passive SRLG 165 may be defined even if no failure occurs in the two network resources in this exemplary embodiment.

In some embodiments and in a similar vein, the two optical fiber links shown in FIG. 6 may be replaced by two free space optical links wherein cloud cover, for example, and the shared failure risk (e.g., SRLG 165) may include a cloud blocking the two free space optical links.

In some embodiments of the present invention, PSRG identification module 82 may be configured to search network resources in the communication network, whether they failed or not, for common risk attributes. PSRG identification module 82 may group network resources identified with the common risk attributes into one or more PSRG, each PSRG defined by a likelihood of a failure risk based on the common risk attributes associated with each PRSG.—

In some embodiments of the present invention, the common risk attribute may be the failures of network resources occurring at substantially the same time and/or located in the same geographical vicinity. A passive SRLG, for example, may include a duct as in FIG. 6 with many optical fibers connecting different nodes over different layers in the communication network. The passive SRLG may include cables and/or optical fibers passing through a tunnel (such as, the Holland or Lincoln tunnels between New Jersey and New York, for example). The passive SRLG may include underground cabling duct, for example, with optical fibers and/or communication cables on the IP layer placed therein. If the PSRG is damaged, such as by a fire in the tunnel, or by a plow tractor plowing across and damaging the underground cabling duct, all of the optical and IP links in the passive SRLG may fail at substantially the same time. A much higher likelihood of common failure may be assigned to the underground cabling duct or tunnel with the network resources within.

In some embodiments of the present invention, any suitable PSRG and the associated shared risk attributes between the network resources even without failures may be defined based on a mapping of the communication network (e.g., from mapping database 90). The mapping may be based on a predefined knowledge of how the communication cables, lines, or optical fibers are routed between the network elements in the communication network. Thus, defining passive shared risk groups may be useful in implementing route planning diversity in the communication network independent of root cause analysis.

Figure 7A:
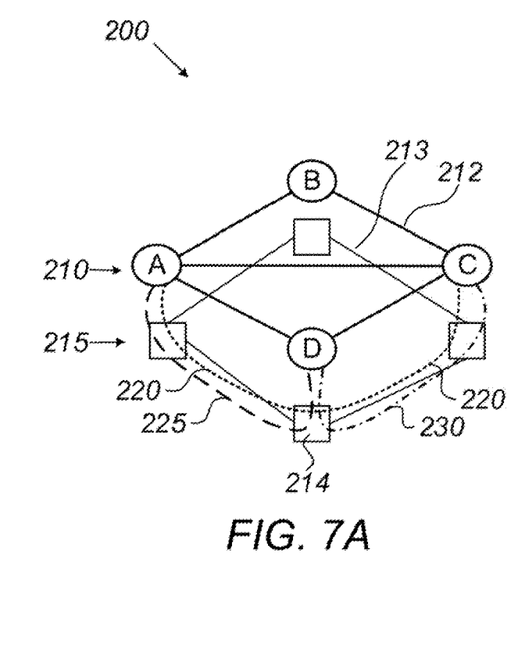
FIG. 7A schematically illustrates a communication network with an IP layer and an optical layer, in accordance with some embodiments of the present invention.

FIG. 7A schematically illustrates a communication network 200 with an IP layer 210 and an optical layer 215, in accordance with some embodiments of the present invention. Communication network 200 may include IP links 212 on IP layer 210 connecting IP nodes denoted IP node A, IP node B, IP node C, and IP node D. Communication network 200 may include optical links on optical layer 215 with optical nodes 214 such as an optical connection 220 may connect IP node A to IP node C. Similarly, an optical connection 225 may connect IP node A to IP node D, and an optical connection 230 may connect IP node D to IP node C.

Figure 7B:
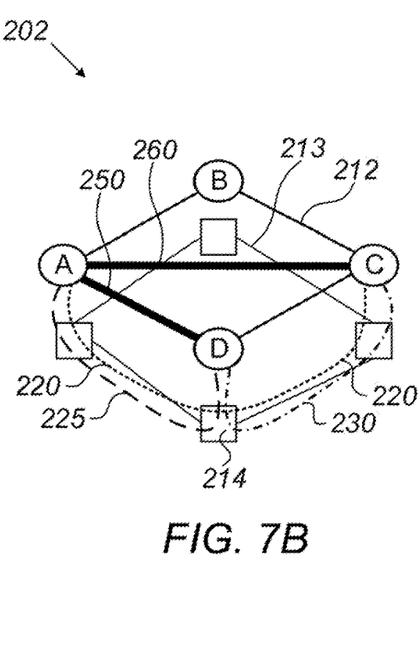
FIG. 7B schematically illustrates a communication network with two IP layer failure alarms on IP alarmed links, in accordance with some embodiments of the present invention.

FIG. 7B schematically illustrates a communication network 202 with two IP layer failure alarms on IP alarmed links 250 and 260, in accordance with some embodiments of the present invention.

Figure 7C:
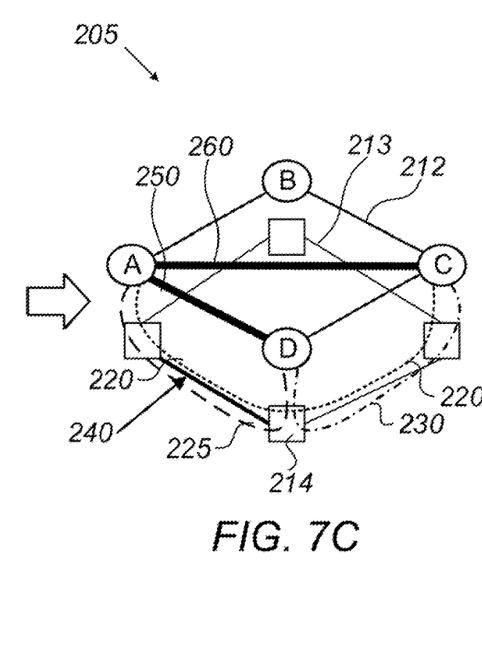
FIG. 7C schematically illustrates a communication network with suspected optical layer failures, in accordance with some embodiments of the present invention.

FIG. 7C schematically illustrates a communication network 205 with a suspected optical layer failure 240, in accordance with some embodiments of the present invention.

In the exemplary embodiments shown in FIGS. 7A-7C, there are no failure alarms from network resources on optical layer 215. Two failure alarms on alarmed IP link 250 and alarmed IP link 260 may be due to a failure in optical layer 215 (e.g., cut fibers, failed optical router, etc.) and/or a failure in IP layer 210 (e.g., a failed IP router port). A failure in optical connection 230 does not explain any of the two failure alarms on alarmed IP link 250 and alarmed IP link 260.

In some embodiments of the present invention, fault isolation module 80 may be configured to deduce suspected multiple optical failures 240 in optical link 220 and in optical link 225 so as to explain the failures result in alarmed IP link 250 and alarmed IP link 260 in the exemplary embodiment shown in FIGS. 7A-7C. This approach may be useful deducing a reduced set of suspected failed resources to be further examined making it easier to isolate the failures automatically or manually, such as by sending a set of requests to the set of suspected failed resources to report their failure and/or their operational status, and/or any other attribute indicative of a failure or initiated shutdown.

Figure 8:
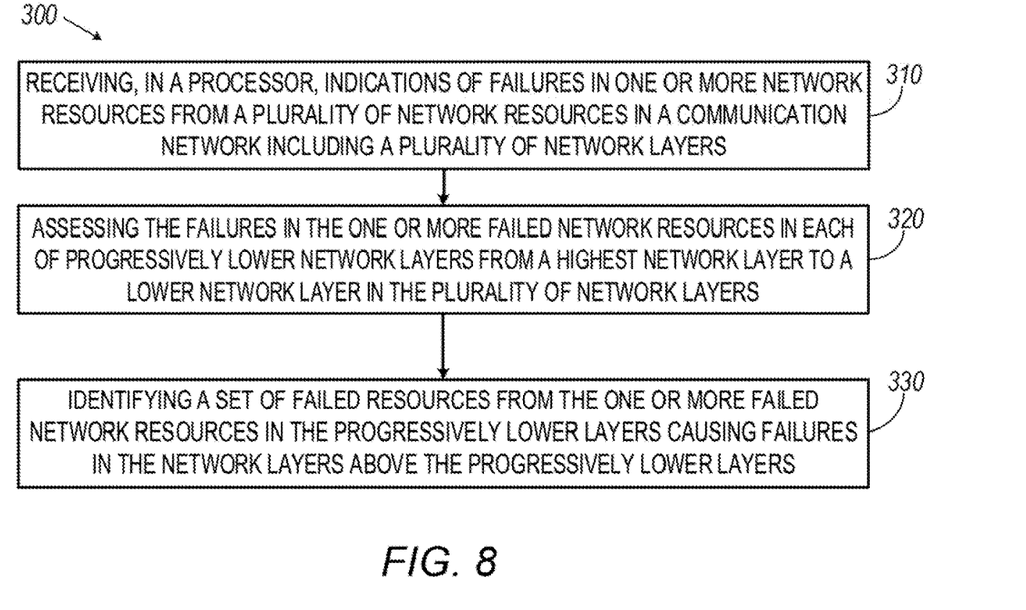
FIG. 8 is a flowchart depicting a method for assessing failures in network resources in a multilayered communication network, in accordance with some embodiments of the present invention.

FIG. 8 is a flowchart depicting a method 300 for assessing failures in network resources in a multilayered communication network, in accordance with some embodiments of the present invention. Method 300 may be executed by processor 75 of system 50 for monitoring and identifying network resource failures in communication network 10.

Method 300 may include receiving 310 indications of failures in one or more network resources from a plurality of network resources in a communication network including a plurality of network layers.

Method 300 may include assessing 320 the failures in the one or more failed network resources in each of progressively lower network layers from a highest network layer to a lowest network layer in said plurality of network layers.

Method 300 may include identifying 330 a set of failed network resources from the one or more failed network resources in the progressively lower network layers causing failures in network layers above the progressively lower network layers.

In some embodiments of the present invention, method 300 may include assessing 320 the failures in the one or more failed network resources in each of progressively higher network layers from the lowest network layer to the highest network layer in said plurality of network layers. Accordingly, method 300 may include identifying 330 a set of failed network resources from the one or more failed network resources in the progressively higher network layers causing failures in network layers below the progressively higher network layers.

In some embodiments, method 300 may include assessing 320 the failures in the one or more failed network resources in each of progressively lower network layers from a highest network layer to a lowest network layer, or in said plurality of network layers in each of progressively higher network layers from the lowest network layer to the highest network layer in said plurality of network layers. Accordingly, method 300 may include identifying 330 a set of failed network resources from the one or more failed network resources in the progressively lower network layers causing failures in network layers above the progressively lower network layer, or in the progressively higher network layers causing failures in network layers below the progressively higher network layers.

In some embodiments of the present invention, method 300 may include assessing 320 the failures in the one or more failed network resources in each of progressively lower network layers from a network layer under a highest network layer to a lowest network layer, or in said plurality of network layers in each of progressively higher network layers from a network layer above the lowest network layer to the highest network layer in said plurality of network layers, or any combination thereof. Accordingly, method 300 may include identifying 330 a set of failed network resources from the one or more failed network resources in the progressively lower network layers causing failures in network layers above the progressively lower network layer, or in the progressively higher network layers causing failures in network layers below the progressively higher network layers.

In some embodiments of the present invention, network resources in any network layer in the communication network may be polled. Thus, when a network resource in a network layer L fails, processor 75 may selectively poll network resources in layers below network layer L and network resource above network layer L so as to identify if these polled network resources failed as well. An exemplary embodiment illustrating this, would be services running in a service layer over the IP layer that may fail if an IP link fails in the IP layer, for example. System 50 may not know about service layer failures since system 50 may not receive real time updates from services running in the service layer. For visual clarity, consider FIG. 4B with another (service) layer on top of IP layer 15 with arrows going upward from IP layer 15 and not only downward to OTN layer 20.

In some embodiments of the present invention, a database, such as mapping data base 90, or a separate database, may store the operational status of the plurality of network resources. Processor 75 may dynamically update the database as to whether any of the plurality of network resources failed (e.g., when new up or down operational status reports from the polled network resources become available).

In some embodiments of the present invention, identifying 330 the set may include identifying root causes of the failures in the communication network.

In some embodiments of the present invention, receiving 310 the indications of failures may include receiving the failure indications in response to polling at least one of said plurality of network resources.

In some embodiments of the present invention, identifying 330 the set of failed network resources may include identifying a minimal set of failed network resources causing all the failures in the communication network.

In some embodiments of the present invention, the highest network layer and the lowest network layer may include an internet protocol (IP) layer and a wavelength division multiplexing (WDM) layer respectively.

In some embodiments of the present invention, method 300 may include arranging the failures according to each network layer in said plurality of network layers.

In some embodiments of the present invention, assessing the failures may include skipping network layers from which no failure indications are received.

In some embodiments of the present invention, method 300 may include, if upon receiving no failure indications from said plurality of network layers in the communication network, deducing a suspected set of network resources from said plurality of network resources in said plurality of network layers that cause the failures in the communication network.

In some embodiments of the present invention, method 300 may include sending requests to the network resources in the suspected set to report their failure.

In some embodiments of the present invention, method 300 may include updating a database with the reported failures of the network resources in the suspected set.

In some embodiments of the present invention, method 300 may include automatically rerouting data traffic around the network resources in the suspected set.

In some embodiments of the present invention, method 300 may include if upon assessing that the failed network resources in the identified set do not account for all of the failures in the one or more failed network resources from the highest network layer to the lowest network layer:
- identifying network resources in a plurality of network resources in a communication network comprising a plurality of network layers having common risk attributes;
- grouping the network resources with the common risk attributes into one or more passive shared risk resource groups (PSRG); and
- assessing a likelihood of a PSRG failure for each of the one or more PSRGs.

In some embodiments of the present invention, method 300 may include outputting the set of failed network resources from the one or more failed network or the likelihood of the PSRG failure for each of the one or more PSRGs.

Figure 9:
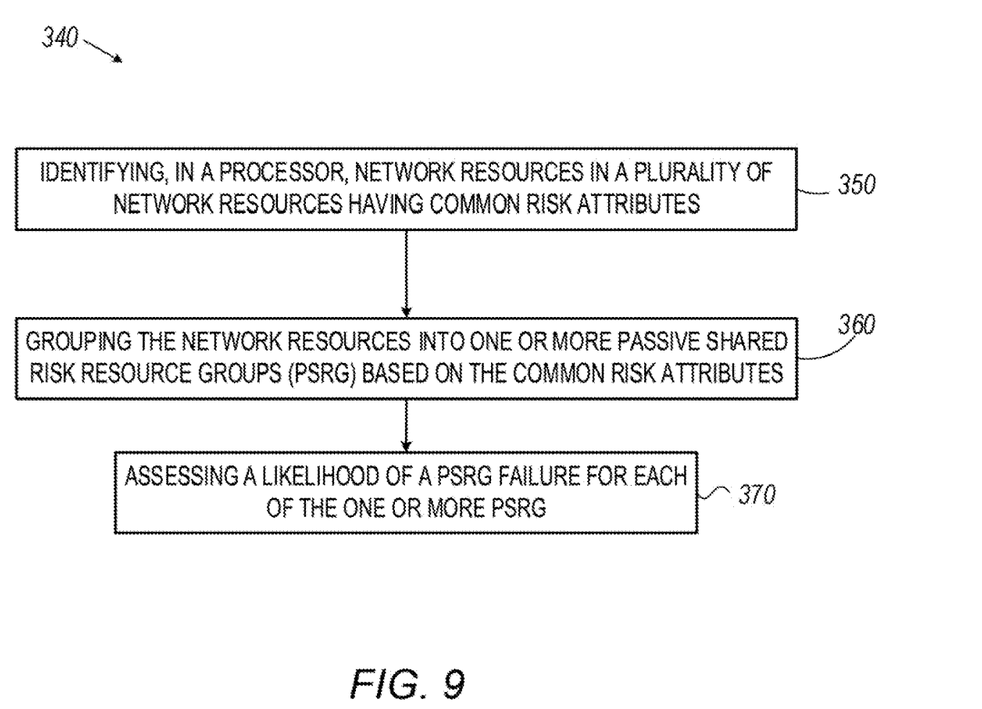
FIG. 9 is a flowchart depicting a method for analyzing failures in network resources in a multilayered communication network using passive shared risk resource groups, in accordance with some embodiments of the present invention.

FIG. 9 is a flowchart depicting a method 340 for analyzing failures in network resources in a multilayered communication network using passive shared risk resource groups, in accordance with some embodiments of the present invention. Method 340 may be executed by processor 75 of system 50.

Method 340 may include identifying 350 network resources in a plurality of network resources having common risk attributes.

Method 340 may include grouping 360 the network resources into one or more passive shared risk resource groups (PSRG) based on the common risk attributes.

Method 340 may include assessing 370 a likelihood of a PSRG failure for each of the one or more PSRGs.

In some embodiments of the present invention, identifying 350 the network resources with the common risk attributes may include limiting a search for the common risk attributes in network resources geographically close to one another.

In some embodiments of the present invention, method 340 may include outputting the likelihood of the PSRG failure for each of the one or more PSRG.

In some embodiments of the present invention, method 340 may include defining the one or more PSRG based on a predefined mapping of said plurality of network resources in the communication network.

In some embodiments of the present invention, identifying 350 the network resources in said plurality of network resources having the common risk attributes may include identifying one or more failed network resources from said plurality of network resources having the common risk attributes.

In some embodiments of the present invention, assessing 370 the likelihood of the PSRG failure may include assigning a higher likelihood when failures of the one or more failed network resources in each of the one or more PSRG meet a predefined criterion.

In some embodiments of the present invention, the predefined criterion is selected from the group consisting of failures of the one or more failed network resources that are geographically close to one another, failures of at least two failed network resources that occur substantially at the same time, and failures of at least two failed network resources that failed together in the past.

In some embodiments of the present invention, method 340 may include automatically restoring the one or more failed network resources associated with each of the one or more PSRG in accordance with the likelihood of the PSRG failure.

Figure 10:
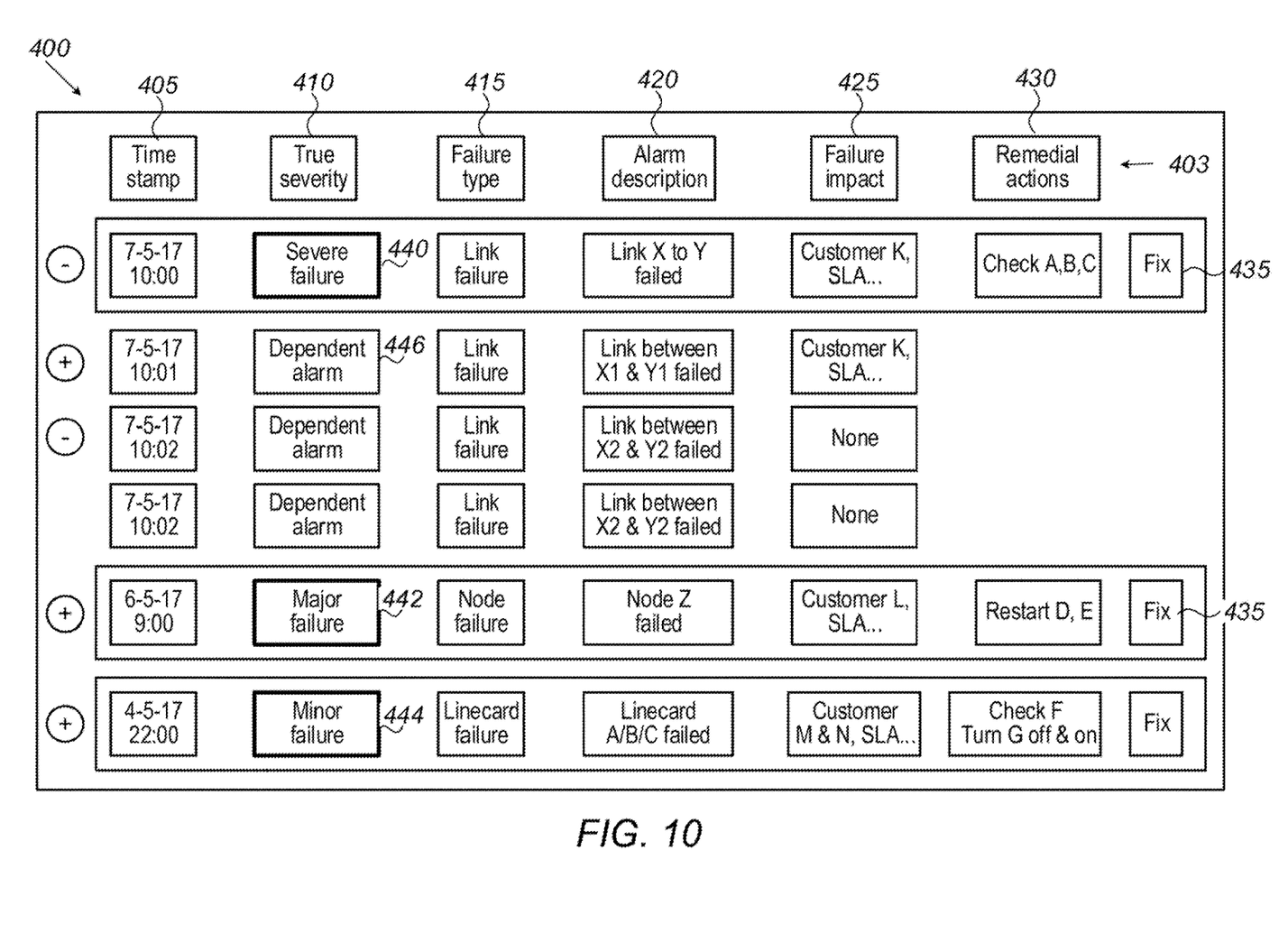
FIG. 10 schematically illustrates a graphic user interface (GUI) for outputting the analysis of network resource failures, in accordance with some embodiments of the present invention.

FIG. 10 schematically illustrates a graphic user interface (GUI) 400 for outputting the analysis of network resource failures, in accordance with some embodiments of the present invention. The output of the failure analyses from fault isolation module 80 may be outputted on display 111. GUI 400 may include a plurality of indicators 403 such as a time stamp 405 (e.g., time/date of failure), a severity type 410, a failure type 415, an alarm description 420, a failure impact 425, remedial actions 430, and a fix indicator 435 for indicating to the operator to fix the designated failed resource in GUI 400.

Failure type 415 may indicate which type of network resource failed (e.g., link, node, linecard). Alarm description 420 may indicate involving which network resources failed, the location of the failure, and what network layer that the failures occurred. Failure impact 425 may indicate the name of the customer impacted and/or the service level agreements (SLA), which may result in large penalties for the network operator due to a service outage for the customer, for example. Remedial actions 430 may indicate to the operator of system 50 as to what measures to take to remedy the failure, such as to check particular failed network resources, to restart a network resource, or to turn in and off a particular network resource, for example. Fix indicator 435 may also indicate which failed network resources to fix first.

In some embodiments, GUI 400 may output severity level 410, which may be assigned to each of the one or more failure indications or alarms. The severity may assist the operator in for identifying which of the failed network resources are the biggest contributors to the degradation in the data traffic in communication network 10. The severity of the failure indications may include various levels of severity 410, such as a severe failure 440, a major failure 442, a minor failure 444, or a warning. Severity level 410 may also indicate if the alarm is a dependent alarm 446.

In some embodiments of the present invention, GUI 400 may include an output with the defined PSRGs with the associated likelihoods of the common failure risk for the defined PSRGs.

It should be understood with respect to any flowchart referenced herein that the division of the illustrated method into discrete operations represented by blocks of the flowchart has been selected for convenience and clarity only. Alternative division of the illustrated method into discrete operations is possible with equivalent results. Such alternative division of the illustrated method into discrete operations should be understood as representing other embodiments of the illustrated method.

Similarly, it should be understood that, unless indicated otherwise, the illustrated order of execution of the operations represented by blocks of any flowchart referenced herein has been selected for convenience and clarity only. Operations of the illustrated method may be executed in an alternative order, or concurrently, with equivalent results. Such reordering of operations of the illustrated method should be understood as representing other embodiments of the illustrated method.

Different embodiments are disclosed herein. Features of certain embodiments may be combined with features of other embodiments; thus certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A method for assessing failures in network resources in a multilayered communication network, the method comprising:
   in a processor, receiving indications of failures in one or more network resources from a plurality of network resources in a communication network comprising a plurality of network layers;
   assessing the failures in the one or more failed network resources in each of progressively lower network layers from a highest network layer to a lowest network layer in said plurality of network layers, or in each of progressively higher network layers from the lowest network layer to the highest network layer in said plurality of network layers;
   identifying a set of failed network resources from the one or more failed network resources in the progressively lower network layers causing failures in network layers above the progressively higher network layers, or from the one or more failed network resources in the progressively higher network layers causing failures in network layers below the progressively higher network layers;
   determining that the set of failed network resources do not account for all failures in the one or more failed network resources;
   identifying a group of network resources having a common risk attribute, wherein at least one failed network resource of the set of failed network resources has the common risk attribute; and
   identifying, from the group of network resources, another failed network resource.

2. The method according to claim 1, wherein identifying the set comprises identifying root causes of the failures in the communication network.

3. The method according to claim 1, wherein receiving the indications of failures is performed at least partly in response to polling at least one of the plurality of network resources.

4. The method according to claim 1, wherein identifying the set of failed network resources comprises identifying a minimal set of failed network resources causing all the failures in the communication network.

5. The method according to claim 1, wherein the highest network layer and the lowest network layer comprise an internet protocol (IP) layer and a wavelength division multiplexing (WDM) layer respectively.

6. The method according to claim 1, further comprising arranging the failures according to each network layer in said plurality of network layers.

7. The method according to claim 1, wherein assessing the failures comprises
   skipping network layers from which no failure indications are received.

8. The method according to claim 1, further comprising if upon receiving no failure indications from said plurality of network layers in the communication network, deducing a suspected set of network resources from said plurality of network resources in said plurality of network layers that cause the failures in the communication network.

9. The method according to claim 8, further comprising sending requests to the network resources in the suspected set to report their failure.

10. The method according to claim 9, further comprising updating a database with the reported failures of the network resources in the suspected set.

11. The method according to claim 8, further comprising automatically routing data traffic around the network resources in the suspected set.

12. The method according to claim 1, wherein the group of network resources comprises a passive shared risk resource group (PSRG), further comprising:
   assessing a likelihood of a PSRG failure for the PSRG.

13. The method according to claim 12, further comprising outputting the set of failed network resources or the likelihood of the PSRG failure for the PSRG.

14. An apparatus for assessing failures in network resources in a multilayered communication network the apparatus comprising:
   a memory; and
   a processor configured to:
   receive indications of failures in one or more network resources from a plurality of network resources in a communication network comprising a plurality of network layers;
   assess the failures in the one or more failed network resources in each of progressively lower network layers from a highest network layer to a lowest network layer in said plurality of network layers, or in each of progressively higher network layers from the lowest network layer to the highest network layer in said plurality of network layers;

identify a set of failed network resources from the one or more failed network resources in the progressively lower network layers causing failures in network layers above the progressively higher network layers, or from the one or more failed network resources in the progressively higher network layers causing failures in network layers below the progressively higher network layers;

determine that the set of failed network resources do not account for all failures in the one or more failed network resources;

identify a group of network resources having a common risk attribute, wherein at least one failed network resource of the set of failed network resources has the common risk attribute; and identify, from the group of network resources, another failed network resource.

15. The apparatus according to claim 14, wherein the processor is configured to identify the set by identifying root causes of the failures in the communication network.

16. The apparatus according to claim 14, wherein the processor is configured to receive the indications of failures by receiving the failure indications in response to polling at least one of said plurality of network resources.

17. The apparatus according to claim 14, wherein the processor is configured to identify the set of failed network resources by identifying a minimal set of failed network resources causing all the failures in the communication network.

18. The apparatus according to claim 14, wherein the highest network layer and the lowest network layer comprise an internet protocol (IP) layer and a wavelength division multiplexing (WDM) layer respectively.

19. The apparatus according to claim 14, wherein the processor is configured to arrange the failures according to each network layer in said plurality of network layers.

20. The apparatus according to claim 14, wherein the processor is configured to assess the failures by skipping network layers from which no failure indications are received.

* * * * *